(12) United States Patent
Mizutani

(10) Patent No.: US 9,583,324 B2
(45) Date of Patent: Feb. 28, 2017

(54) HIGH-VOLTAGE POWER UNIT AND MASS SPECTROMETER USING THE POWER UNIT

(71) Applicant: SHIMADZU CORPORATION, Kyoto-shi, Kyoto (JP)

(72) Inventor: Shiro Mizutani, Uji (JP)

(73) Assignee: SHIMADZU CORPORATION, Kyoto-shi (JP)

( * ) Notice: Subject to any disclaimer, the term of this patent is extended or adjusted under 35 U.S.C. 154(b) by 0 days.

(21) Appl. No.: 14/906,738

(22) PCT Filed: Jul. 23, 2013

(86) PCT No.: PCT/JP2013/069916
§ 371 (c)(1),
(2) Date: Jan. 21, 2016

(87) PCT Pub. No.: WO2015/011783
PCT Pub. Date: Jan. 29, 2015

(65) Prior Publication Data
US 2016/0172172 A1    Jun. 16, 2016

(51) Int. Cl.
*H01J 49/26* (2006.01)
*H01J 49/02* (2006.01)
(Continued)

(52) U.S. Cl.
CPC ............ *H01J 49/022* (2013.01); *H02M 1/32* (2013.01); *H02M 3/28* (2013.01); *H02M 7/06* (2013.01);
(Continued)

(58) Field of Classification Search
USPC ........................................ 250/281, 282, 283
See application file for complete search history.

(56) References Cited

U.S. PATENT DOCUMENTS 6,002,600 A    12/1999 Scapellati
7,855,355 B2 *    12/2010 Mizutani ............... H01J 49/022
250/281
(Continued)

FOREIGN PATENT DOCUMENTS

EP    1 931 020 A1    6/2008
EP    1975759 A1    10/2008
(Continued)

OTHER PUBLICATIONS

Written Opinion for PCT/JP2013/069916 dated Oct. 8, 2013. [PCT/ISA/237].
(Continued)

*Primary Examiner* — Nicole Ippolito
(74) *Attorney, Agent, or Firm* — Sughrue Mion, PLLC

(57) ABSTRACT

An excessive overshoot preventing unit (16) is connected to a loop in which a command voltage Vf according to a difference between: a voltage obtained by dividing an output voltage Vout as a high voltage; and a control voltage V cont set from the outside is obtained and fed back to each of drive circuits (3 and 5) of a positive voltage generating unit (2) and a negative voltage generating unit (4). The excessive overshoot preventing unit (16) clamps the command voltage Vf at a voltage value according to the control voltage Vcont. An overshoot that occurs in the voltage generating unit (2 or 4) at the time of polarity switching mainly depends on a circuit constant, and hence the amount of overshoot is excessive in the case of a low-voltage output even if the amount of overshoot is optimal in the case of a rated output. To deal with this, in this power unit, the overshoot of the command voltage Vf in suppressed by the excessive overshoot preventing unit (16), and hence the output voltage can be promptly settled to a target voltage even in the case of a low-voltage output.

6 Claims, 6 Drawing Sheets

(51) Int. Cl.
  *H02M 3/28*  (2006.01)
  *H02M 7/10*  (2006.01)
  *H02M 1/32*  (2007.01)
  *H02M 7/06*  (2006.01)
  *H02M 1/00*  (2006.01)
  *H01J 49/00*  (2006.01)

(52) U.S. Cl.
  CPC ........... *H02M 7/10* (2013.01); *H01J 49/0095* (2013.01); *H02M 2001/0077* (2013.01)

(56) References Cited

U.S. PATENT DOCUMENTS

| | | |
|---|---|---|
| 2009/0230297 A1 | 9/2009 | Mizutani |
| 2013/0070484 A1 | 3/2013 | Mukaibara |

FOREIGN PATENT DOCUMENTS

| | | |
|---|---|---|
| JP | 4687716 B2 | 5/2011 |
| JP | 2013-66298 A | 4/2013 |
| WO | 2007/029327 A1 | 3/2007 |

OTHER PUBLICATIONS

Communication dated Jun. 28, 2016, issued by the European Patent Office in corresponding European Application No. 13889872.1.
International Search Report for PCT/JP2013/069916, dated Oct. 8, 2013. [PCT/ISA/210].

\* cited by examiner

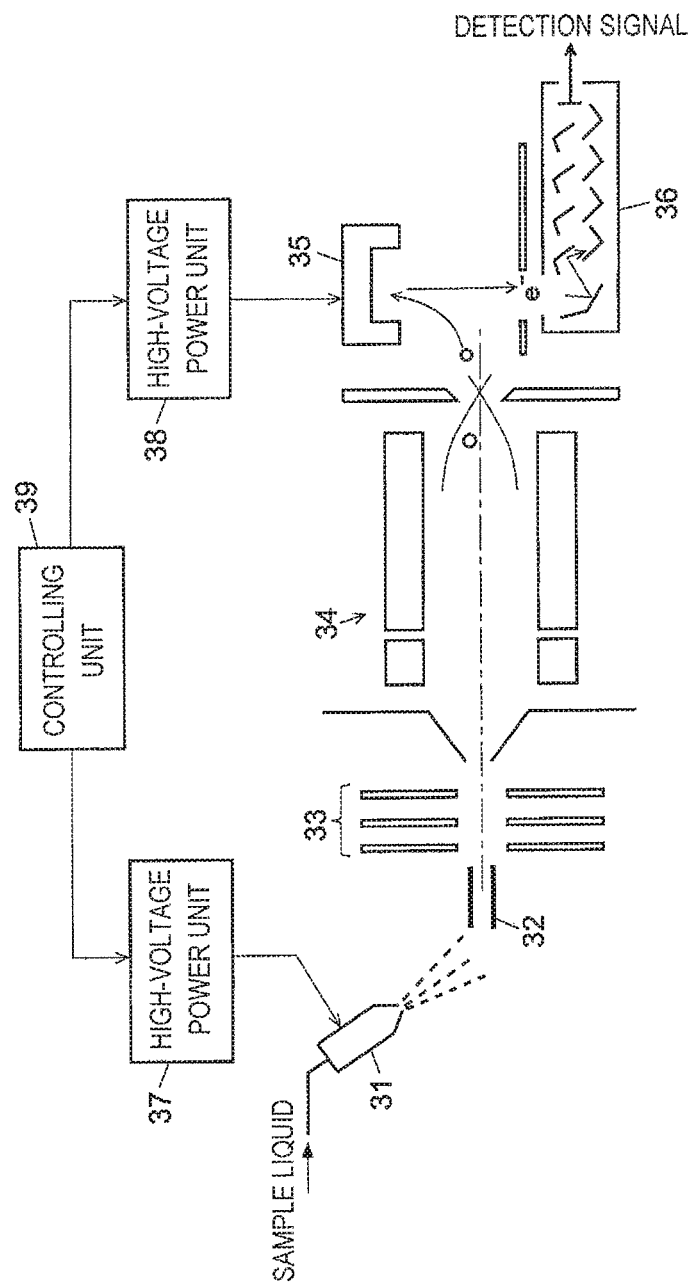

US 9,583,324 B2

HIGH-VOLTAGE POWER UNIT AND MASS SPECTROMETER USING THE POWER UNIT

CROSS REFERENCE TO RELATED APPLICATIONS

This application is a National Stage of International Application No. PCT/JP2013/069916 filed Jul. 23, 2013, the contents of all of which are incorporated herein by reference in their entirety.

TECHNICAL FIELD

The present invention relates to a high-voltage power unit capable of switching the polarity of an output voltage between positive and negative and to a mass spectrometer using the power unit.

BACKGROUND ART

Ion detectors including a combination of a conversion dynode and a secondary electron multiplier are often used for detecting ions with high sensitivity in a mass spectrometer. In such an ion detector, a high voltage (± several [kV] to ±10 [kV], for example) having a polarity opposite to that of the ions to be analyzed needs to be applied to a conversion dynode in order to selectively detect positive ions and negative ions. In a liquid chromatograph mass spectrometer, an ion source according to an electrospray ionization (ESI) method, for example, is used for vaporizing and ionizing a liquid sample. In such an ion source, a high voltage (± several [kV], for example) having the same polarity as that of the ions to be analyzed needs to be applied to the tip of a nozzle for spraying the liquid sample.

In these applications, the polarity of the high voltage to be applied needs to be changed in accordance with the polarity of the ions to be analyzed. Therefore, a high-voltage power unit capable of switching the polarity of an output voltage for one line is used. One of the conventionally known high-voltage power units for switching high voltages having different polarities is a power unit using a high-voltage reed relay (see, for example, Patent Literature 1).

In such a high-voltage power unit using a reed relay, in order to avoid a damage to the relay due to possible spiked discharges at the time of switching the polarity of an output voltage, it is necessary to take the following procedures: decrease the output voltage having one polarity; operate the relay to change the contacts once the output voltage becomes adequately low; and, subsequently, increase the output voltage having the other polarity. Consequently, it takes some time to switch the polarity. In the case where, for example, positive ion detection and negative ion detection are alternately performed every short period of time, an ion non-detection period increases in a mass spectrometer. This causes a problem of affecting the accuracy of an analysis.

As a solution to such a problem, a high-voltage power unit capable of switching the polarity of an output voltage at high speed is disclosed in Patent Literature 2. FIG. 5 is a circuit configuration diagram of a principal part of the high-voltage power unit, and 6A and FIG. 6B are waveform charts illustrating change in a voltage in the case of polarity switching in the high-voltage power unit. With reference to FIG. 5, FIG. 6A, and FIG. 6B, a configuration and operation of the high-voltage power unit is schematically described.

In the high-voltage power unit illustrated in FIG. 5, a positive voltage generating unit 2 includes: a booster transformer T1; a drive circuit 3 for driving a primary winding of the booster transformer T1; and a rectifier circuit using a Cockcroft-Walton circuit composed of four capacitors C1 to C4 and four diodes D1 to D4 connected to a secondary winding of the booster transformer T1. A negative voltage generating unit 4 is similar in a basic configuration to the positive voltage generating unit 2 except for the fact that each of diodes D5 to D8 in a Cockcroft-Walton circuit is oriented opposite to that in the positive voltage generating unit 2.

An output terminal P2 of the positive voltage generating unit 2 and an output terminal Q1 of the negative voltage generating unit 4 are connected. Another output terminal Q2 of the negative voltage generating unit 4 is grounded. Between the output terminals P1 and P2 of the positive voltage generating unit 2, a resistor 6 is connected in parallel. Between the output terminals Q1 and Q2 of the negative voltage generating unit 4, another resistor 7 is connected in parallel. A high voltage Vout whose polarity is switched is output from the output terminal P1 of the positive voltage generating unit 2. Between this high-voltage output terminal and the ground, a resistor 8 and a resistor 9 are connected in series. A voltage signal is fed back to a controlling unit 1 from a junction point between the resistors 8 and 9.

The drive circuits 3 and 5 each include a direct current voltage supply, which is connected in series to the primary winding of the booster transformer T1, and a switching element. The voltage applied (or the current supplied) from the direct current voltage supply to the primary winding is connected and disconnected by the switching element. The pulse width of a rectangular wave signal for ON/OFF driving of the switching element is adjusted based on a signal given by the controlling unit 1. Accordingly, the effective electric power supplied to the primary winding of the booster transformer T1 is changed, and consequently output voltages of the positive voltage generating unit 2 and the negative voltage generating unit 4 are changed.

To output a positive high voltage +HV, based on a polarity switching command signal (not illustrated), only the drive circuit 3 in the positive voltage generating unit 2 is operated, and the drive circuit 5 in the negative voltage generating unit 4 is stopped. At this time, since a voltage value corresponding to the voltage +HV appearing at the high-voltage output terminal is fed back to the controlling unit 1, the controlling unit 1 compares this voltage value with a target control voltage and adjusts the signal supplied to the drive circuit 3 so as to reduce an error between the compared voltages. Accordingly, the output voltage +HV is precisely set to any target voltage. Contrary to the above case, to output a negative high voltage, only the drive circuit 5 in the negative voltage generating unit 4 is operated, and the drive circuit 3 in the positive voltage generating unit 2 is stopped.

During a transition period in which output of the positive high voltage +HV is switched to output of a negative high voltage, the controlling unit 1 controls each of the drive circuits 3 and 5 such that the output of the positive voltage generating unit 2 changes from the voltage +HV to zero while simultaneously the output of the negative voltage generating unit 4 changes from zero to subside on a voltage −HV after a overshoot (see waveforms (a) and (b) in FIG. 6A). Thus, by deliberately overshooting the voltage whose absolute value rises from zero in this way, a slow fall of the other voltage that returns to zero is compensated for. This enables the output voltage Vout to promptly reach a target voltage. Accordingly, the output voltage Vout is switched in a short period of time.

Such shortening of the polarity switching time using the deliberate overshoot as described above is significantly effective when a voltage defined as a rated output is output as illustrated in FIG. 6A (in this example, when the rated output voltage is ±10 [kV] and the output voltage Vout is ±10 [kV]), and the output voltage Vout is smoothly switched. However, because the overshoot voltage is optimized for the rated output, in the case where an actual output voltage is lower than the rated output voltage, the overshoot is excessive, so that the time required for the output voltage Vout to become stable is adversely longer.

FIG. 6B illustrates an example in which the rated output is ±10 [kV] and the output voltage Vout is ±5 [kV]. In this example, the positive output voltage or the negative output voltage greatly overshoots at the time of polarity switching. This affects the output voltage Vout, so that the polarity switching time is much longer than that in the case of the rated output.

CITATION LIST

Patent Literature

[Patent Literature 1] U.S. Pat. No. 6,002,600 (see FIG. 1C)
[Patent Literature 2] JP 4687716 B

SUMMARY OF INVENTION

Technical Problem

An object of the present invention, which has been made in order to solve the above-mentioned problem, is to provide: a high-voltage power unit capable of switching, even in the case where an actual output voltage is lower than orated output voltage, the polarity of the output voltage at high speed similarly to the case of the rated output; and a mass spectrometer using the power unit.

Solution to Problem

In order to achieve the above-mentioned object, the present invention provides a high-voltage power unit for selectively outputting a high voltage having a positive or negative polarity, the high-voltage power unit including:

a positive voltage generating unit for generating a positive high voltage;

a negative voltage generating unit for generating a negative high voltage;

a first load unit connected between a pair of output terminals of the positive voltage generating unit; and a second load unit connected between a pair of output terminals of the negative voltage generating unit, wherein one of the pair of output terminals of the positive voltage generating unit is connected to one of the pair of output terminals of the negative voltage generating t to connect the two voltage generating units in series, any of another of the pair of output terminals of the positive voltage generating unit and another of the pair of output terminals of the negative voltage generating unit is defined as a reference side, while a high-voltage output whose polarity is switched is taken out from the another terminal defined as the reference side, and the high-voltage power unit further includes:

a) a controlling unit for controlling a voltage generated by each of the positive voltage generating unit and the negative voltage generating unit, through feedback control based on a detection voltage obtained by dividing the high-voltage output, the controlling unit sending a command voltage to each of the positive voltage generating unit and the negative voltage generating unit such that the output voltage of one of the two voltage generating units changes from a first predetermined voltage to zero while simultaneously the output voltage of another of the two voltage, generating units changes from zero to subside on a second predetermined voltage after an overshoot, at a time of switching the polarity of the high-voltage output between positive and negative; and b) a voltage limiting unit for limiting a value of the command voltage to suppress the overshoot, the voltage limiting unit being provided between: the controlling unit; and the positive voltage generating unit and the negative voltage generating unit.

Here, the first load unit and the second load unit have a function of substantially adding the output voltage of the positive voltage generating unit and the output voltage of the negative voltage generating unit. For example, in the high-voltage power unit disclosed in Patent Literature 2, simple resistors are used as these load units. Moreover, in a high-voltage power unit disclosed in an international patent application (International Patent Application No. PCT/JP2012/078595) that has already been filed by the applicant of the present application, for example, an impedance-variable circuit including one or more FETs and a current source capable of supplying a variable current correspond to these load units.

In the high-voltage power unit according to the present invention, the controlling unit outputs the command voltage such that the output voltage of the positive voltage generating unit changes from the first predetermined voltage to zero while simultaneously the output voltage of the negative voltage generating unit changes from zero to subside on the second predetermined voltage after the overshoot, at the time of switching the polarity of the high-voltage output from the positive polarity to the negative polarity, for example, The output voltage of the positive voltage generating unit does not immediately become zero from the first predetermined voltage, but the voltage value gradually decreases and it takes some timebefore the voltage value actually becomes zero. On the other hand, the absolute value of the output voltage of the negative voltage generating unit rapidly rises from zero to overshoot. Hence, the slow voltage decrease in the positive voltage generating unit is compensated for by the overshoot in the negative voltage generating unit, and the high-voltage output obtained by adding the output voltages of the first load unit and the second load unit rapidly changes.

The amount of overshoot is mainly determined depending on the constant of the circuit constituting each voltage generating unit. Hence, if the circuit constant and the like are adjusted in advance such that the amount of overshoot is optimal in the case of a rated voltage output, the amount of overshoot is relatively excessively large when the high-voltage output is lower than the rated voltage. To deal with this, in the high-voltage power unit according to the present invention, voltage limitation is performed by the voltage limiting unit in a loop of the feedback control, and hence an excessive overshoot can be avoided. Consequently, influences of such an excessive overshoot on the high-voltage output obtained by adding the output voltages of the first load unit and the second load unit are reduced, and the high-voltage output is promptly settled to a desired voltage.

According to a specific form of the high-voltage power unit according to the present invention, the controlling unit may include an error amplifier for obtaining a difference between a control voltage and the detection voltage, the control voltage being set from an outside for setting a voltage value of a high-voltage output desired to be taken out, and the voltage limiting unit may clamp a voltage at an output of the error amplifier using a Zener diode connected to the output of the error amplifier.

More specifically, the voltage limiting unit may further include a comparator for comparing the control voltage with a reference voltage, and the voltage limiting unit may enable a clamp operation based on a Zener effect of the Zener diode, when the control voltage falls below the reference voltage.

As a result, using a simple configuration, that is, at low costs, an excessive overshoot can be suppressed, and the voltage can be promptly settled at the time of switching the polarity of the high-voltage output.

Moreover, in the high-voltage power unit according to the present invention, preferably, the voltage limiting unit may include: a plurality of Zener diodes connected to the output of the error amplifier and having different Zener voltages; and a plurality of comparators for respectively comparing the control voltage with different reference voltages, the comparators being provided so as to respectively correspond to the Zener diodes, and the voltage limiting unit may change a clamp voltage by changing a Zener diode whose clamp operation is enabled in accordance with a value of the control voltage.

According to this configuration, the overshoot can be finely adjusted in accordance with the value of the high voltage output from the present power unit, and hence the voltage can be promptly settled to any output voltage at the time of polarity switching.

The high-voltage power unit according to the present invention described above can be used in various applications and apparatuses that require a positive high voltage and a negative high voltage in an alternative manner, and the high-voltage power unit is particularly suitable for a mass spectrometer.

Specifically, in a mass spectrometer, the high-voltage power unit may be used in an ion source and/or an ion detector that requires switching of the polarity of a high voltage to be applied in accordance with the polarity of ions to be analyzed. As described above, the high-voltage power unit according to the present invention can switch the polarity of the output voltage at high speed. Accordingly, in the case where, for example, positive ion detection and negative ion detection are alt lately performed every short period of time, a non-detection period in which both positive and negative ions cannot be detected can be shortened, and detection leakage of ions can be reduced.

Advantageous Effects Of Invention

In the high-voltage power unit according to the present invention, even in the case where an actual output voltage is lower than a rated output voltage, in other words, independently of the value (absolute value) of the output voltage, the polarity of the output voltage can be switched between positive and negative at high speed. Consequently, for example, in a mass spectrometer using the high-voltage power unit according to the present invention, a cycle time of alternate switching between positive ion detection and negative ion detection can be shortened, and overlooking of both positive ions and negative ions can be reduced.

BRIEF DESCRIPTION OF DRAWINGS

FIG. 4 is a schematic configuration diagram of a mass spectrometer using the high-voltage power unit of the present embodiment.

DESCRIPTION OF EMBODIMENTS

Figure 1:
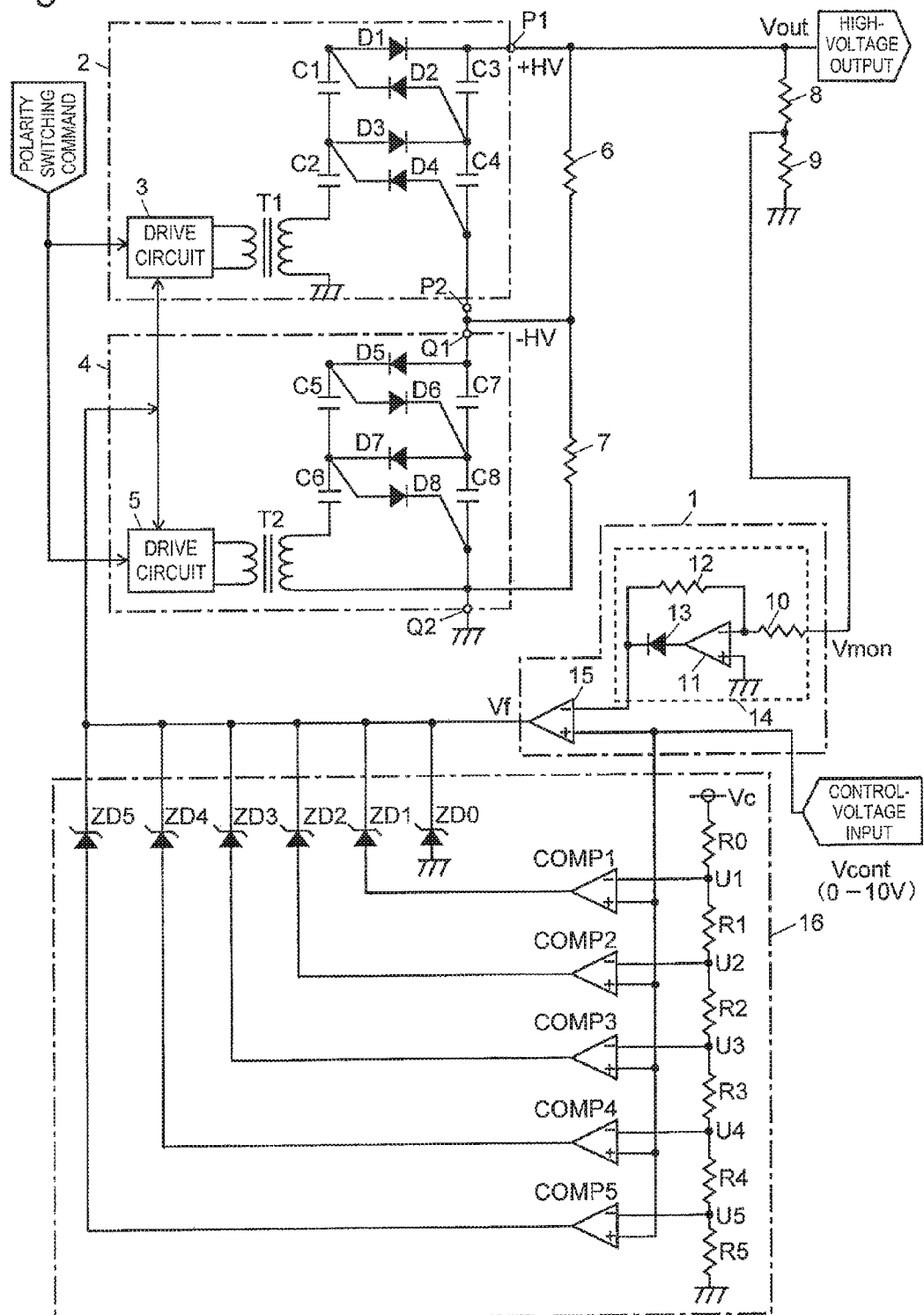
FIG. 1 is a schematic configuration diagram of a principal part of a high-voltage power unit according to an embodiment of the present invention.
Figure 5:
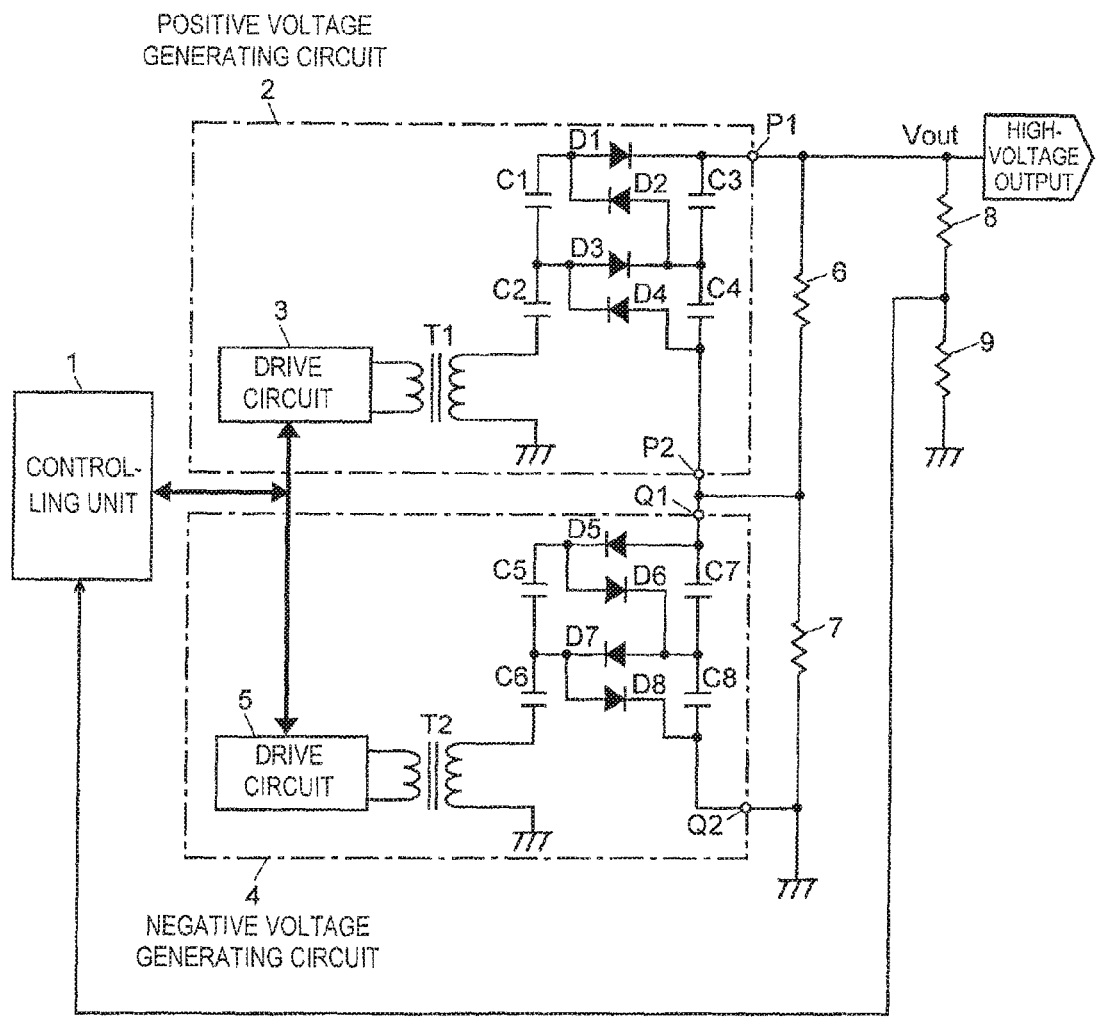
FIG. 5 is a configuration diagram of a principal part of the conventional high-voltage power unit.

Hereinafter, an embodiment of the high-voltage power unit according to the present invention is described with reference to the attached drawings. FIG. 1 is a schematic configuration diagram of a principal part of a high-voltage power unit according the present embodiment. In FIG. 1, component members identical or corresponding to those in the conventional high-voltage power unit illustrated in FIG. 5 are designated by identical reference signs.

In the high-voltage power unit of the present embodiment, a positive voltage generating unit 2 and a negative voltage generating unit 4 which include drive circuits 3 and 5, respectively, a series connection circuit of resistors 6 and 7, and a series connection circuit of resistors 8 and 9 are completely identical to those in the conventional high-voltage power unit.

As illustrated in FIG. 1, a controlling unit 1 receives a voltage signal from a junction point between the resistors 8 and 9 to perform feedback control on the drive circuits 3 and 5, and includes a monitor voltage detecting amplifier 14 and an error amplifier 15. The monitor voltage detecting amplifier 14 includes resistors 10 and 12, a diode 13, and an operational amplifier 11.

An output voltage Vout of the present high-voltage power unit is divided by the resistors 8 and 9, and is input to the monitor voltage detecting amplifier 14. For example, the ratio of the voltage division by the resistors 8 and 9 is determined such that a voltage of 1/1000 of the output voltage Vout is input to the monitor voltage detecting amplifier 14. Accordingly, for example, when the output voltage Vout is +10 [kV], a voltage of +10 [V] is input to the monitor voltage detecting amplifier 14. Only when the output of the operational amplifier 11 is positive, the diode 13 in the monitor voltage detecting amplifier 14 is brought into a conductive state. When the output of the operational amplifier 11 is negative, the operational amplifier 11 does not substantially function. Hence, the monitor voltage detecting amplifier 14 outputs the absolute value of an input voltage Vmon having a positive or negative polarity. Accordingly, for example, when the output voltage Vout is ±10 [kV], the input voltage Vmon of the monitor voltage detecting amplifier 14 is ±10 [V], and the output voltage of the monitor voltage detecting amplifier 14 is +10 [V].

The error amplifier 15 compares the output voltage of the monitor voltage detecting amplifier 14 with a control voltage Vcont set from the outside, and outputs a voltage Vf according to the difference between the compared voltages. Here, the control voltage Vcont is set in a range of 0 to +10 [V]. For example, in the case where the output voltage is set to +10 [kV], the control voltage is set to +10 [V]. In the configuration of the power unit of the present embodiment, the output voltage Vf of the error amplifier 15 independent of the positive or negative polarity of the output voltage Vout is input to each of the drive circuits 3 and 5, and a command on the polarity of the output voltage Vout is given to each of the drive circuits 3 and 5 via another signal line. Alternatively, the controlling unit 1 may generate a command voltage to be sent to each of the drive circuits 3 and 5 in response to a polarity switching command.

Figure 6A:
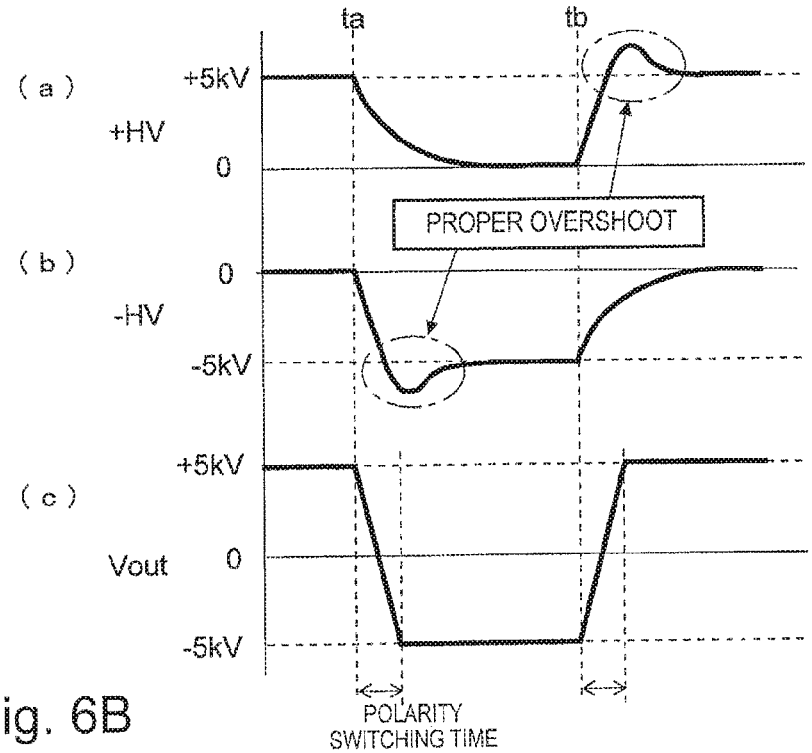
FIG. 6A and FIG. 6B are waveform charts for describing an operation at the time of switching the polarity of an output voltage in the conventional high-voltage power unit.
Figure 6B:
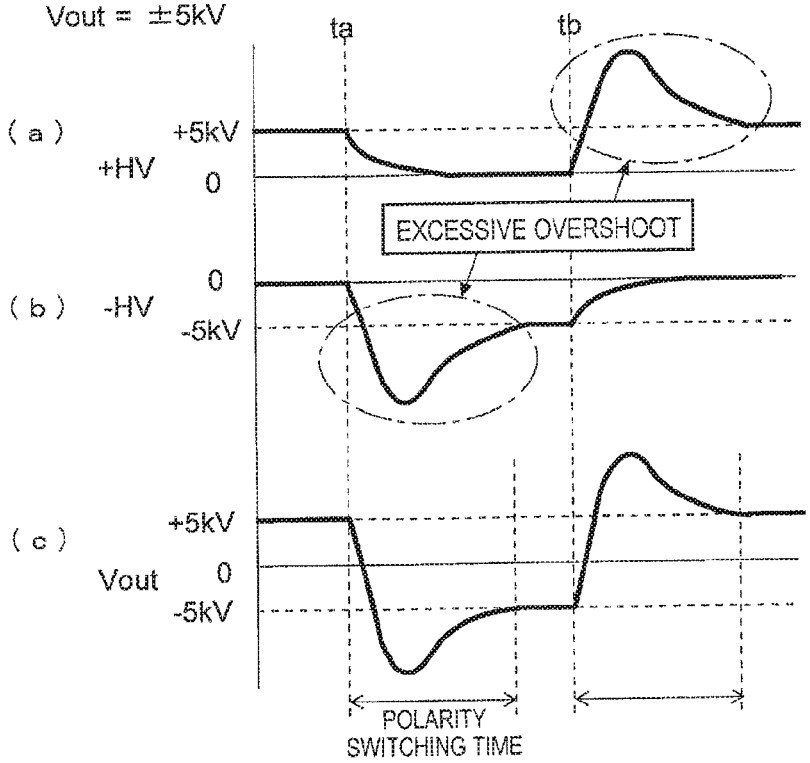

The above-mentioned configuration is basically the same as the configuration of the conventional high-voltage power unit illustrated in FIG. 5. Accordingly, if an excessive overshoot preventing unit 16 to be described later is not provided, in the case where the output voltage Vout is lower (the absolute value thereof is smaller) than a rated Output of ±10 [kV], such a phenomenon as illustrated in FIG. 6B can occur.

In view of the above, as a characteristic configuration of the high-voltage power unit of the present embodiment, the excessive overshoot preventing unit 16 is connected between an output terminal of the error amplifier 15 and the drive circuits 3 and 5. The excessive overshoot preventing unit 16 includes: resistors R0, R1, R2, R3, R4, and R5 for dividing a reference supply voltage Vc; comparators COMP1, COMP2, COMP3, COMP4, and COMP5 for respectively receiving the voltages divided by the resistors R0 to R5 as one input (input on a minus input terminal side) and receiving the control voltage Vcont as another input (input on a plus input terminal side); Zener diodes ZD1, ZD2, ZD3, ZD4, and ZD5 respectively connected between output terminals of the comparators COMP1 to COMP5 and the output terminal of the error amplifier 15; and a Zener diode ZD0 connected between the ground and the output terminal of the error amplifier 15. In this example, comparators of an open collector output type are respectively used as the comparators COMP1 to COMP5.

Here, the reference supply voltage Vc is +10 [V], and resistance values of the resistors RO to R5 are determined such that reference voltages U1, U2, U3, U4, and U5 at the minus input terminals of the comparators COMP1, COMP2, COMP3, COMP4, and COMP5 are respectively +9.2 [V], +8.2 [V], +7.2 [V], +6.2 [V], and +5.2 [V]. Moreover, Zener diodes having Zener voltages of 22 [V], 20 [V] 18 [V] 16 [V], 14 [V], and 12 [V] are respectively used as the Zener diodes ZD0, ZD1, ZD2, ZD3, ZD4, and ZD5.

Figure 2:
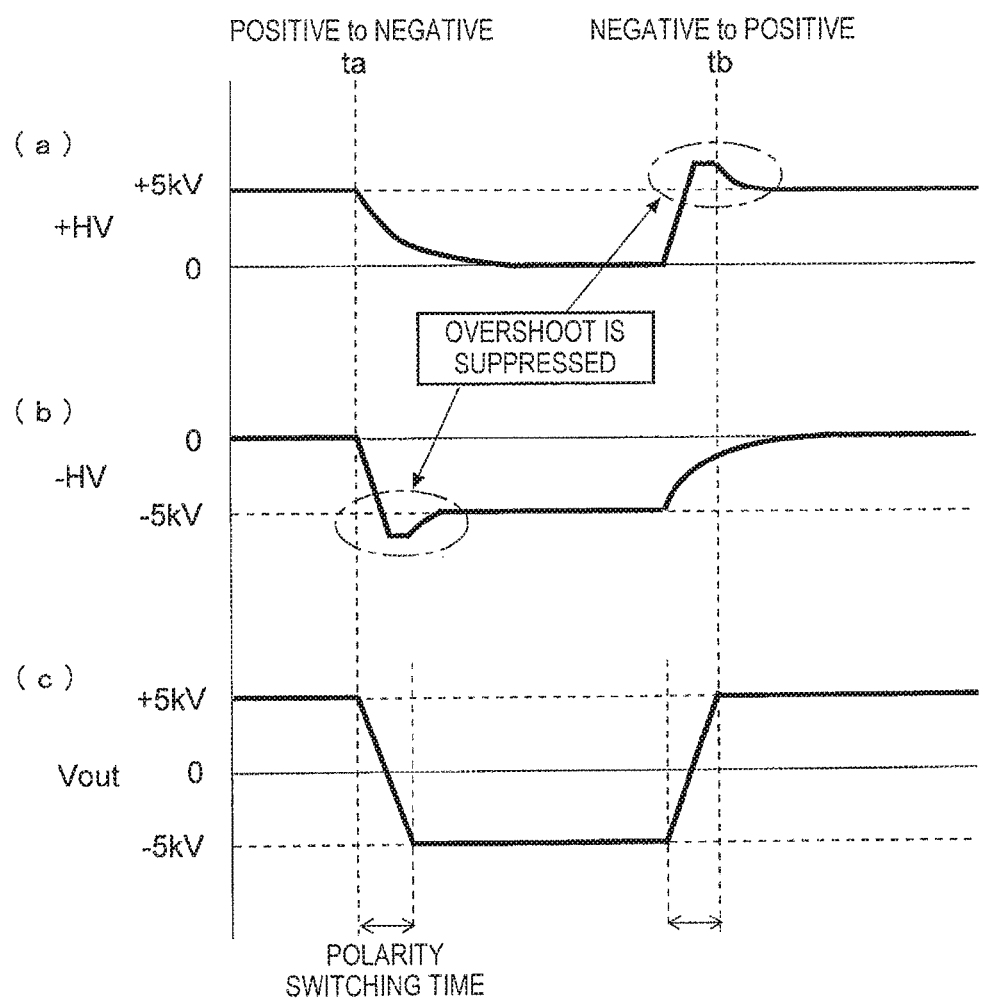
FIG. 2 is a waveform chart for describing an operation at the time of switching the polarity of an output voltage in the high-voltage power unit of the present embodiment.

A characteristic operation at the time of output voltage switching in the high-voltage power unit of the present embodiment, which is mainly achieved by an operation of the excessive overshoot preventing unit 16, is described with reference to a waveform chart illustrated in FIG. 2.

Now, it is assumed as an example that the control voltage Vcont is set to +9 [V] in order to make the output voltage Vout +9 [kV]. When the control voltage Vcont is 9 [V] this control voltage Vcont is lower than the reference voltage U1=9.2 [V] given to the minus input terminal of the comparator COMP1, and hence the output of the comparator COMP1 is a "L" level (about 0 [V]. At this time, all the reference voltages U2 to U5 given to the minus input terminals of the other comparators COMP2 to COMP5 are lower than the control voltage Vcont, and hence all the outputs of the comparators COMP2 to COMP5 have high impedance. As is well known, Zener diodes have a characteristic that, if a reverse voltage exceeding a Zener voltage is applied, a large current flows in the opposite direction (that is, from a cathode to an anode). Accordingly, when the output of the comparator COMP1 is about 0 [V], and if the output voltage Vf of the error amplifier 15 exceeds about 20 [V] as the Zener voltage of the Zener diode ZD1, the Zener diode ZD1 breaks down to feed a current n the opposite direction, d the output voltage Vf is clamped at about 20 [V].

Although the Zener voltages (12 to 18 [V]) of the Zener diodes ZD2 to ZD5 are lower than the Zener voltage (20 [V]) of the Zener diode ZD1, the anodes of the Zener diodes ZD2 to ZD5 have high impedance, and the Zener diodes ZD2 to ZD5 do not operate. Moreover, the Zener voltage of the Zener diode ZD0 having an anode potential of 0 [V] is 22 [V]. Accordingly, in this case, the Zener diode ZD1 breaks down at the lowest voltage. Namely, only the Zener diode ZD1 substantially contributes to the clamp operation, and the other Zener diodes ZD0 and ZD2 to ZD5 can be regarded as not existing.

In this high-voltage power unit, the input voltage of each of the drive circuits 3 and 5 and the absolute value of the output voltage Vout are substantially proportional to each other. Hence, when the output voltage Vf of the error amplifier 15 is 20 [V] and the positive voltage generating unit 2, the negative voltage generating unit 4, and the like are configured such that the output voltage Vout is 10 [kV], the steady output voltage Vf of the error amplifier 15 when the output voltage Vout is +9 [kV] is about 18 [V]. As described above, because the output voltage Vf of the error amplifier 15 is clamped at about 20 [V] due to the breakdown effect of the Zener diode ZD1, a voltage of 20−18=2 [V] is secured as an allowance, and an overshoot corresponding to this allowance is tolerated.

That is, in the conventional high-voltage power unit not provided with the excessive overshoot preventing unit 16, there is substantially no limit on the overshoot of the output voltage Vf of the error amplifier 15. In comparison, in the high-voltage power unit of the present embodiment, if the overshoot of the output voltage Vf of the error amplifier 15 exceeds about 2 [V], the Zener diode ZD1 operates, and hence the maximum value of the overshoot is limited to 2 [V]. Because the overshoot of the voltage input to each of the drive circuits 3 and 5 is limited in this way, in both the cases where the polarity of the output voltage Vout is switched from positive to negative and conversely where the polarity of the output voltage Vout is switched from negative to positive, the output voltage of each of the voltage generating units 2 and 4 is suppressed from overshooting as illustrated in waveforms (a) and (b) in FIG. 2. As a result, influences of an excessive overshoot on time output voltage Vout are eliminated, and the output voltage Vout is promptly settled to a desired voltage.

Similarly, it is assumed that the control voltage Vcont is set to 8 [V] in order to make the output voltage Vout 8 [kV]. This control voltage Vcont is lower than the reference voltage U2=8.2 [V] given to the minus input terminal of the comparator COMP2, and hence both the outputs of the comparators COMP1 and COMP2 are about 0 [V]. The Zener voltage of the Zener diode ZD2 is lower than the Zener voltage of the Zener diode ZD1, and hence the Zener diode ZD2 clamps the output voltage Vf of the error amplifier 15. That is, although the steady output voltage of the error amplifier 15 is 16 [V], the output voltage of the error amplifier 15 is clamped at 18 [V], and the maximum value of the overshoot is limited to 2 [V] also in this case. Similarly, in the case where the output voltage Vout is 7 [kV] or 6 [kV], the maximum value of the overshoot is limited to 2 [V].

In this way, in the high-voltage power unit of the present embodiment, even in the case where the output voltage Vout a rated output voltage, the output voltage of the error amplifier 15 at the time of output control is clamped at its steady output voltage +α(in this example, α=about 2 [V]), whereby the occurrence of an excessive overshoot can be prevented even at the time of polarity switching. Then, an overshoot voltage generated at the time of polarity switching is controlled in an appropriate state, whereby the output voltage Vout can be promptly settled at the time of the polarity switching.

Figure 3A:
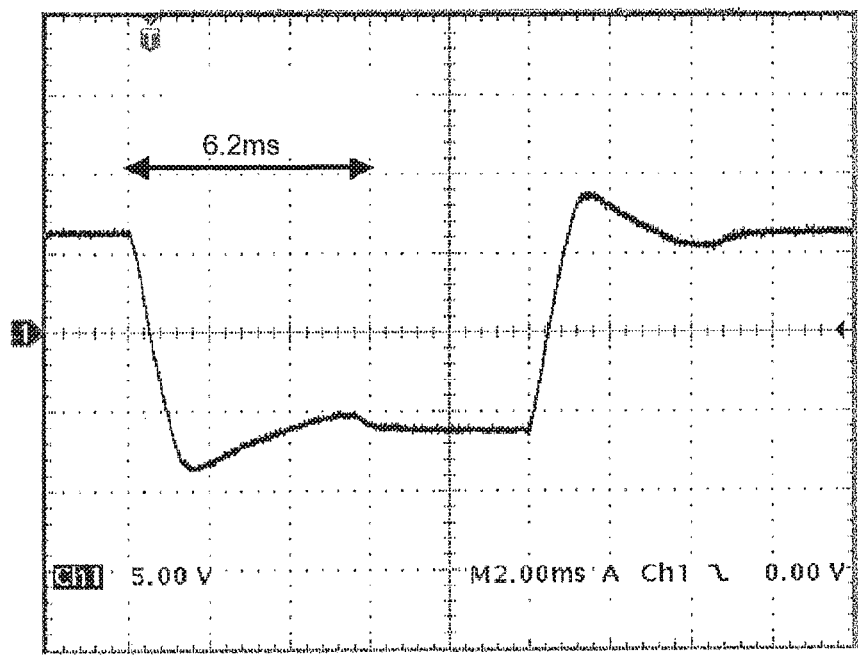
FIG. 3A and FIG. 3B are waveform charts based on actual measurement at the ti of switching the polarity of an output voltage in the high-voltage power unit of the present embodiment and a conventional high-voltage power unit.
Figure 3B:
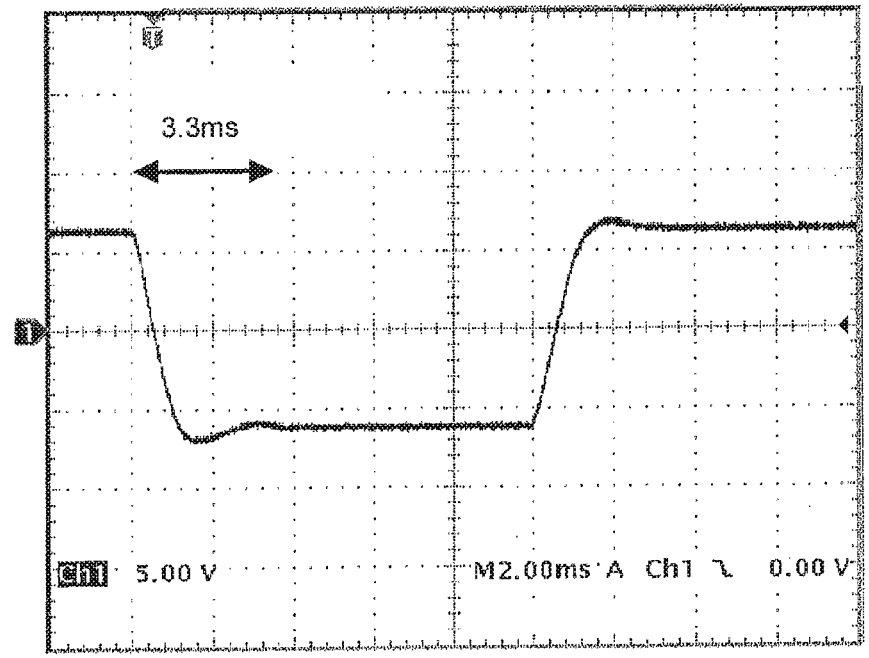

FIG. 3A is an output voltage waveform chart based on actual measurement at the time of polarity switching in the conventional high-voltage power unit, and FIG. 3B is an output voltage waveform chart based on actual measurement at the time of polarity switching in the high-voltage power unit of the present embodiment. In this example, the rated output voltage is ±10 [kV], and the output voltage Vout is set to ±6 [kV]. As illustrated in FIG. 3A, the voltage settlement time at the time of polarity switching is 6.2 [ms] in the conventional power unit, whereas the voltage settlement time at the time of polarity switching is shortened to about half the time, that is, 3.3 [ms] in the power unit of the present embodiment. This proves that the high-voltage power unit of the present embodiment can switch the polarity of a voltage at high speed even in the case where the output voltage Vout is set to be lower than the rated output voltage.

In the high-voltage power unit of the above-mentioned embodiment, comparators of an open collector output type are respectively used as the comparators COMP1 to COMP5. Alternatively, a similar operation can naturally be achieved using other output types (for example, totem-pole type push-pull output) by changing the circuit configuration of the excessive overshoot preventing unit 16 as appropriate.

FIG. 4 illustrates an example of a schematic configuration of a mass spectrometer using the high-voltage power unit of the present embodiment. This mass spectrometer is used for analyzing a sample liquid eluted from a liquid chromatograph, for example. The sample liquid is sprayed into an atmosphere of approximate atmospheric pressure from a nozzle 31 for an electrospray. This ionizes sample atoms and molecules contained in the sample liquid. In this process, a high voltage (normally, approximately several [kV]) having a different polarity according to the polarity of the ions to be generated needs to be applied to the tip of the nozzle 31. As a voltage source therefor, such a high-voltage power unit 37 of a polarity switching type as described above can be used.

The ions generated by the above-mentioned ionization are sent to a subsequent stage through a desolvation pipe 32, and are focused by an ion lens 33 driven by a voltage source (not illustrated) before being introduced into a space across the long axis of a quadrupole filter 34. A voltage in which an RF voltage and a DC voltage are superposed is applied to the quadrupole filter 34 by the voltage source (not illustrated). This voltage forms an electric field, by which only ions having a predetermined mass number pass through the quadrupole filter 34. A high voltage (normally, approximately 10 [kV]) having a polarity opposite to that of the ions to be analyzed is applied to a conversion dynode 35 in the further subsequent stage by such a high-voltage power unit 38 of a polarity switching type as described above. The ions induced by an electric field formed by this high voltage touch the conversion dynode 35 to emit secondary electrons. The emitted secondary electrons fly downward and reach a secondary electron multiplier 36. They are multiplied inside the secondary electron multiplier 36, and a detection signal corresponding to the number of the secondary electrons that flew in first, i.e. the number of the ions that reach the conversion dynode 35, is taken out.

That is, in the mass spectrometer having the above-mentioned configuration, a controlling unit 39 sends a control signal for switching to each of the high-voltage power units 37 and 38 in accordance with the polarity of the ions to be analyzed. Since switching of the polarity of the output voltage in the high-voltage power units 37 and 38 can be promptly performed as described above, the period in which ion detection cannot be performed is shortened even in the case where, for example, positive ion detection and negative ion detection are repeatedly alternately performed every short period of time. Accordingly, fine mass chromatograms and total ion chromatograms can be created.

FIG. 4 illustrates an example of a simplified configuration. It is apparent that the above-mentioned high-voltage power unit of a polarity switching type can be used in a portion other than that described above.

The configurations of the high-voltage power unit described in the above-mentioned embodiment are merely an example of the present invention, and it is clear that any modifications, additions, and adjustment to be made appropriately within the gist of the present invention are also embraced in the scope of the claims of the present application. It is also clearly understood that the high-voltage power unit according to the present invention is not only applicable to the mass spectrometers, but also to various applications and apparatuses that require switching of high voltages of approximately ± several [kV] at high speed.

REFERENCE SIGNS LIST

1 . . . Controlling Unit
10, 12 . . . Resistor
11 . . . Operational Amplifier
14 . . . Monitor Voltage Detecting Amplifier
15 . . . Error Amplifier
2 . . . Positive Voltage Generating Unit
4 . . . Negative Voltage Generating Unit
3, 5 . . . Drive Circuit
T1, T2 . . . Booster Transformer
D1 to D8 . . . Diode
C1 to C8 . . . Capacitor
6, 7, 8, 9 . . . Resistor
16 . . . Excessive Overshoot Preventing Unit
COMP1 to COMP5 . . . Comparator
ZD0 to ZD5 . . . Zener Diode
R0 to R5 . . . Resistor
31 . . . Nozzle
32 . . . Desolvation Pipe
33 . . . Ion Lens
34 . . . Quadrupole Filter
35 . . . Conversion Dynode
36 . . . Secondary Electron Multiplier
37 . . . High-Voltage Power Unit
38 . . . High-Voltage Power Unit
39 . . . Controlling unit

The invention claimed is:
1. A high-voltage power unit for selectively outputting a high voltage having a positive or negative polarity, the high-voltage power unit comprising:

a positive voltage generating unit for generating a positive high voltage;

a negative voltage generating unit for generating a negative high voltage;

a first load unit connected between a pair of output terminals of the positive voltage generating unit; and a second load unit connected between a pair of output terminals of the negative voltage generating unit, wherein one of the pair of output terminals of the positive voltage generating unit is connected to one of the pair of output terminals of the negative voltage generating unit to connect the two voltage generating units in series, any of another of the pair of output terminals of the positive voltage generating unit and another of the pair of output terminals of the negative voltage generating unit is defined as a reference side, while a high-voltage output whose polarity is switched is taken out from the another terminal defined as the reference side, and the high-voltage power unit further comprises:
  a) a controlling unit for controlling a voltage generated by each of the positive voltage generating unit and the negative voltage generating unit, through feedback control based on a detection voltage obtained by dividing the high-voltage output, the controlling unit sending a command voltage to each of the positive voltage generating unit and the negative voltage generating unit such that the output voltage of one of the two voltage generating units changes from a first predetermined voltage to zero while simultaneously the output voltage of another of the two voltage generating units changes from zero to subside on a second predetermined voltage after an overshoot, at a time of switching the polarity of the high-voltage output between positive and negative; and
  b) a voltage limiting unit for limiting a value of the command voltage to suppress the overshoot, the voltage limiting unit being provided between: the controlling unit; and the positive voltage generating unit and the negative voltage generating unit, wherein the controlling unit includes an error amplifier for obtaining a difference between a control voltage and the detection voltage, the control voltage being set from an outside for setting a voltage value of a high-voltage output desired to be taken out, and the voltage limiting unit clamps a voltage at an output of the error amplifier using a Zener diode connected to the output of the error amplifier.

2. The high-voltage power unit according to claim 1, wherein
  the voltage limiting unit further includes a comparator for comparing the control voltage with a reference voltage, and
  the voltage limiting unit enables a clamp operation based on a Zener effect of the Zener diode, when the control voltage falls below the reference voltage.

3. The high-voltage power unit according to claim 2, wherein
  the voltage limiting unit includes: a plurality of Zener diodes connected to the output of the error amplifier and having different Zener voltages; and a plurality of comparators for respectively comparing the control voltage with different reference voltages, the comparators being provided so as to respectively correspond to the Zener diodes, and
  the voltage limiting unit changes a clamp voltage by changing a Zener diode whose clamp operation is enabled in accordance with a value of the control voltage.

4. A mass spectrometer using a high-voltage output by the high-voltage power unit according to claim 1 in an ion source and/or an ion detector, wherein
  a polarity of the high-voltage output by the high-voltage power unit is switched in accordance with a polarity of ions to be analyzed.

5. A mass spectrometer using a high-voltage output by the high-voltage power unit according to claim 2 in an ion source and/or an ion detector, wherein
  a polarity of the high-voltage output by the high-voltage power unit is switched in accordance with a polarity of ions to be analyzed.

6. A mass spectrometer using a high-voltage output by the high-voltage power unit according to claim 3 in an ion source and/or an ion detector, wherein
  a polarity of the high-voltage output by the high-voltage power unit is switched in accordance with a polarity of ions to be analyzed.

* * * * *